US 11,313,531 B1

(12) United States Patent
Murugesan et al.

(10) Patent No.: US 11,313,531 B1
(45) Date of Patent: Apr. 26, 2022

(54) VEHICLE SEARCHLIGHT SYSTEM WITH LIGHT SOURCE COUPLED TO SPHERICAL MOTOR

(71) Applicant: HONEYWELL INTERNATIONAL INC., Charlotte, NC (US)

(72) Inventors: Gokul Murugesan, Bangalore (IN); Raghuveer Desai, Bangalore (IN); Panduranga Rao Somarowthu, Bangalore (IN); Abhijit Kulkarni, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/109,902

(22) Filed: Dec. 2, 2020

(30) Foreign Application Priority Data

Oct. 16, 2020 (IN) .............................. 202011045135

(51) Int. Cl.
| | |
|---|---|
| *B60Q 1/06* | (2006.01) |
| *F21S 41/657* | (2018.01) |
| *F21S 41/141* | (2018.01) |
| *F21S 41/19* | (2018.01) |
| *F21S 41/20* | (2018.01) |
| *B64D 47/04* | (2006.01) |
| *F21Y 115/10* | (2016.01) |
| *F21W 107/30* | (2018.01) |
| *H02K 11/30* | (2016.01) |

(52) U.S. Cl.
CPC ............ *F21S 41/657* (2018.01); *B64D 47/04* (2013.01); *F21S 41/141* (2018.01); *F21S 41/19* (2018.01); *F21S 41/28* (2018.01); *F21W 2107/30* (2018.01); *F21Y 2115/10* (2016.08); *H02K 11/30* (2016.01); *H02K 2201/18* (2013.01)

(58) Field of Classification Search
CPC .. B60Q 1/24; B60Q 1/245; B60Q 1/06; F21V 21/14; F21S 41/141; F21S 41/657
See application file for complete search history.

(56) References Cited

U.S. PATENT DOCUMENTS

| | | | | |
|---|---|---|---|---|
| 1,501,411 A | * | 7/1924 | Hyatt ...................... | B60Q 1/24 |
| | | | | 362/504 |
| 3,258,595 A | * | 6/1966 | Galante .................... | F41G 3/16 |
| | | | | 398/112 |
| 4,661,737 A | * | 4/1987 | Barri ..................... | H02K 17/16 |
| | | | | 244/166 |

(Continued)

FOREIGN PATENT DOCUMENTS

| | | |
|---|---|---|
| CN | 107414288 A | 12/2017 |
| CN | 107433899 A | 12/2017 |

(Continued)

*Primary Examiner* — Ismael Negron
(74) *Attorney, Agent, or Firm* — Lorenz & Kopf, LLP

(57) ABSTRACT

A searchlight assembly includes a mount structure adapted to be mounted to an external surface of a vehicle; a lens coupled to an extending from the mount structure and having an inner surface defining a cavity; a spherical motor disposed within the cavity and coupled to the mount structure to independently rotate about two perpendicular axes relative to the mount structure and the lens; and a light source disposed within the cavity and coupled to the spherical motor to be rotatable therewith about the two perpendicular axes.

9 Claims, 4 Drawing Sheets

(56) References Cited

U.S. PATENT DOCUMENTS

| | | | | |
|---|---|---|---|---|
| 4,719,381 A * | 1/1988 | Miles | .................. | H02K 41/02 |
| | | | | 310/166 |
| 4,855,838 A * | 8/1989 | Jones | .................. | H04N 5/2251 |
| | | | | 348/84 |
| 5,806,956 A * | 9/1998 | Hyun-Jo | ................ | B60Q 1/245 |
| | | | | 362/272 |
| 7,236,200 B2 * | 6/2007 | Vernon | ................ | H04N 5/2256 |
| | | | | 348/370 |
| 7,296,917 B1 * | 11/2007 | Chiu | .................... | B60Q 1/245 |
| | | | | 340/12.5 |
| 7,614,804 B2 * | 11/2009 | Kim | .................... | G03B 17/561 |
| | | | | 348/373 |
| 7,675,208 B2 * | 3/2010 | Bandera | .................. | H02K 7/14 |
| | | | | 310/80 |
| 8,786,422 B2 * | 7/2014 | Wang | .................... | B60Q 1/245 |
| | | | | 340/471 |
| 9,893,574 B2 * | 2/2018 | Bandera | .................. | H02K 3/28 |
| 9,925,921 B1 | 3/2018 | Deyaf et al. | | |
| 10,374,483 B1 * | 8/2019 | Dai | ...................... | F16M 13/02 |
| 2008/0137353 A1 | 6/2008 | Larsen et al. | | |

FOREIGN PATENT DOCUMENTS

| | | |
|---|---|---|
| CN | 208442772 U | 1/2019 |
| CN | 109314452 A | 2/2019 |
| EP | 3269596 A1 | 1/2018 |

\* cited by examiner

VEHICLE SEARCHLIGHT SYSTEM WITH LIGHT SOURCE COUPLED TO SPHERICAL MOTOR

CROSS REFERENCE TO RELATED APPLICATION

The present application claims benefit of prior filed Indian Provisional Patent Application No. 202011045135, filed Oct. 16, 2020, which is hereby incorporated by reference herein in its entirety.

TECHNICAL FIELD

The present invention generally relates to searchlight systems, and more particularly relates to a spherical motor-based searchlight system.

BACKGROUND

Searchlight systems may be implemented onboard various vehicles, including airborne vehicles, land-based vehicles, and unmanned vehicles. Searchlights generally play a role in different land-based and airborne missions at night, including law enforcement missions, search and rescue missions, coast guard operations, offshore operations, emergency medical services, and the like, to illuminate areas of interest.

Regardless of the end-use vehicle and end-use purpose, many searchlight systems include two independent actuators. The actuators are used to rotate the searchlight about two perpendicular axes—a pan axis and a tilt axis. More specifically, one actuator is used to rotate the light about the pan axis, and the other actuator is used to rotate the light about the tilt axis.

During use, the actuators are directly exposed to the environment. Thus, a relatively high torque requirement and relatively harsh environmental conditions may be imposed on the actuators. These factors can lead to reduced reliability for the searchlight system. Moreover, relying on multiple actuators increases overall system, size, weight, and cost.

Hence, there is a need for a searchlight system that does not rely on multiple actuators to rotate the searchlight about two perpendicular axes, that does not have a relatively high torque requirement, and that is not exposed to environmental conditions. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a searchlight assembly includes a mount structure, a lens, a spherical motor, and a light source. The mount structure is adapted to mount to an external surface of a vehicle and has electronics disposed therein. The lens is coupled to and extends from the mount structure and has inner surface that defines a cavity. The spherical motor is disposed within the cavity and is rotationally coupled to the mount structure. The spherical motor is independently rotatable, relative to the mount structure and the lens, about two perpendicular axes. The light source is disposed within the cavity and is coupled to the spherical motor and is rotatable therewith about the two perpendicular axes.

In another embodiment, a searchlight assembly includes a mount structure, a lens, a spherical motor, and a light source. The mount structure is adapted to mount to an external surface of a vehicle and has electronics disposed therein. The lens is coupled to and extends from the mount structure and has inner surface that defines a cavity. The spherical motor is disposed within the cavity and is rotationally coupled to the mount structure. The spherical motor is independently rotatable, relative to the mount structure and the lens, about two perpendicular axes. The light source is disposed within the cavity and is coupled to the spherical motor and is rotatable therewith about the two perpendicular axes. The electronics disposed within the mount structure include a power supply, a motor controller, and a light source driver. The motor controller is coupled to the power supply and the spherical motor. The motor controller is operable to controllably energize the spherical motor to thereby cause the spherical motor to independently rotate about the two perpendicular axes. The light source driver is coupled to the power supply and the light source and is operable to selectively energize and deenergize the light source.

In yet another embodiment, an aircraft searchlight system includes an aircraft, a mount structure, a lens, a spherical motor, and a light source. The mount structure is mounted to an external surface of a vehicle and has electronics disposed therein. The lens is coupled to and extends from the mount structure and has inner surface that defines a cavity. The spherical motor is disposed within the cavity and is rotationally coupled to the mount structure. The spherical motor is independently rotatable, relative to the mount structure and the lens, about two perpendicular axes. The light source is disposed within the cavity and is coupled to the spherical motor and is rotatable therewith about the two perpendicular axes. The two perpendicular axes include a first axis and a second axis. The spherical motor is rotatable 180-degrees ($\pi$-rad) about the first axis and is rotatable 360-degrees ($2\pi$-rad) about the second axis.

Furthermore, other desirable features and characteristics of the searchlight assembly and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
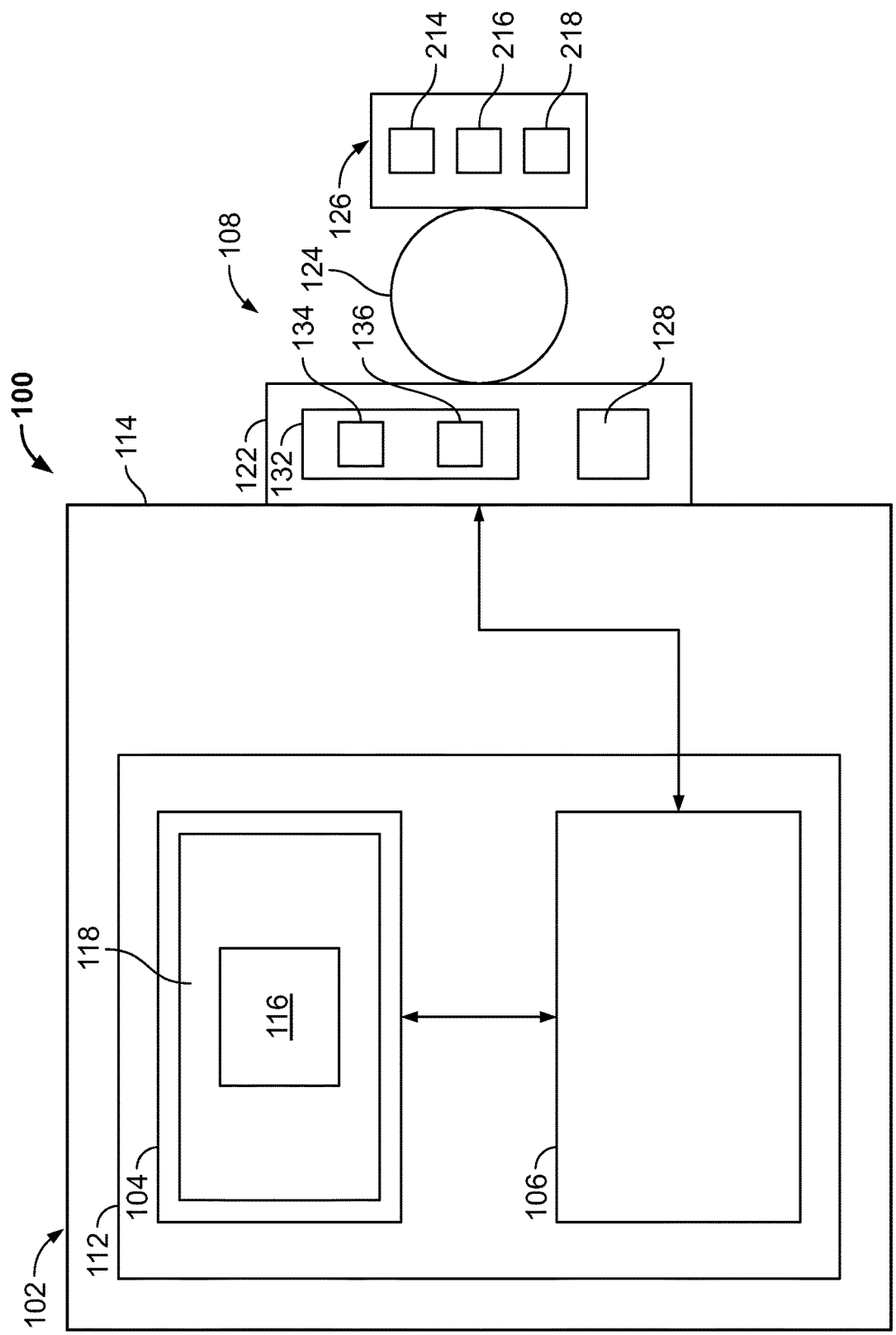
FIG. 1 depicts a functional block diagram of one embodiment of a searchlight system 100 for a mobile platform.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In addition, those skilled in the art will appreciate that embodiments of the present disclosure may be practiced in conjunction with any type of light system, and the search and landing light for a mobile platform or vehicle is merely one exemplary embodiment according to the present disclosure. In addition, while the search and landing light is described herein as being employed with a mobile platform or vehicle, such as a bus, motorcycle, train, motor vehicle, marine vessel, aircraft, rotorcraft, unmanned aerial vehicle and the like, the various teachings of the present disclosure can be used with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the search and landing light system described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Referring now to FIG. 1, a functional block diagram of one embodiment of a searchlight system 100 for a mobile platform, such as an aircraft 102, is depicted. In the depicted embodiment, the searchlight system 100 includes a human-machine interface 104, a communication device 106, and at least one searchlight assembly 108. It will be appreciated that the aircraft 102 is merely one example of a mobile platform or vehicle and, as discussed, the searchlight system 100 may be employed on various other types of mobile platforms or vehicles, including aircraft, marine vessels, land vehicles, etc.

Regardless of the particular mobile platform, the human-machine interface 104 and communication device 106 are, at least in the depicted embodiment, disposed within a cabin 112 of the aircraft 102, and the at least one searchlight assembly 108 is coupled to an external surface (e.g., the fuselage) 114 of the aircraft 102 and is generally remote from the human-machine interface 104. As will be discussed, the searchlight assembly 108 is in communication with the human-machine interface 104 via the communication device 106 to activate or deactivate the searchlight assembly 108 and to rotate the searchlight assembly 108 relative to the aircraft 102. It should be noted that while the human-machine interface 104 and the communication device 106 are described herein as being within the cabin 112 of the aircraft 102, the human-machine interface 104 and the communication device 106 may be associated with a portable electronic device, including, but not limited to, an electronic flight bag, a tablet, smart phone, etc.

The human-machine interface 104 is in operable communication with the communication device 106 via either a wired or wireless communication medium. The human-machine interface 104 may be configured in a variety of ways. In some embodiments, the human-machine interface 104 may include various switches, one or more buttons, a touchscreen interface 116 that may be overlaid on a display 118, a keyboard, a joystick, an audible device, a microphone associated with a speech recognition system, or various other human-machine interface devices. In one example, the touchscreen interface 116 may receive input from a user, such as an operational mode and/or a position for the searchlight assembly 108. Generally, upon the receipt input from the user, the human-machine interface 104 transmits signals, via the communication device 106, to the searchlight assembly 108.

It will be appreciated that the touchscreen interface 116 may include, but is not limited to, a resistive touchscreen panel, a capacitive touchscreen panel, a projected capacitance touchscreen panel, a surface capacitive touchscreen panel, a surface acoustic wave touchscreen panel, etc. It will additionally be appreciated that the display 118 may be implemented using any one of numerous suitable technologies for displaying information, including, but not limited to, a liquid crystal display (LCD), organic light emitting diode (OLED), plasma, or a cathode ray tube (CRT). In this example, the display 118 is an electronic display capable of graphically displaying one or more user interfaces.

The communication device 106 may comprises any one of numerous suitable systems for receiving data from and transmitting data to the searchlight assembly 108. For example, the communication device 106 may implement bi-directional communications with the searchlight assembly 108 via Bluetooth® or by via any one of numerous Wi-Fi standards. Thus, the communication device 106 may include, for example, a Bluetooth® transceiver and/or a Wi-Fi transceiver. Further, it should be noted that the communication device 106 is optional, as the searchlight assembly 108 may be in communication with the user interface 104 via a suitable communication architecture associated with the aircraft 102 that enables the transfer of power, data, and commands.

The searchlight assembly 108 includes a mount structure 122, a spherical motor 124, a light source 126. The mount structure 122 is used to mount the searchlight assembly 108 to the external surface of the aircraft 102 and has various electronics disposed therein. In the depicted embodiment, the electronics disposed within the mount structure 122 include at least a power supply 128 and a controller 132. The controller 132 is coupled to the power supply 128, the spherical motor 124, and the light source 126, and includes both a motor controller 134 and a light source driver 136. The motor controller 134 is coupled to the spherical motor 124 and is operable, in response to commands from the human-machine interface 104, to controllably energize the spherical motor 124 to thereby cause the spherical motor 124 to independently rotate about two perpendicular axes. The light source driver 136 is coupled to the light source 126 and is responsive to commands received from the human-machine interface 104 to selectively energize and deenergize the light source 126.

Before proceeding further, it is noted that the controller 132 may be implemented, for example, with one or more processor and one or more computer readable storage devices or media. The processor(s) can be any custom made or commercially available processor, a central processing unit (CPU), a graphics processing unit (GPU), an auxiliary processor among several processors associated with the controller 132, a semiconductor based microprocessor (in the form of a microchip or chip set), a macroprocessor, any combination thereof, or generally any device for executing instructions. The computer readable storage device(s) or media may include volatile and nonvolatile storage in read-only memory (ROM), random-access memory (RAM), and keep-alive memory (KAM), for example. KAM is a persistent or non-volatile memory that may be used to store various operating variables while the processor(s) is powered down. The computer-readable storage device(s) or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 132 in controlling components associated with the searchlight assembly 108.

The instructions may include one or more separate programs, each of which comprises an ordered listing of executable instructions for implementing logical functions. The instructions, when executed by the processor(s), receive and process input signals, perform logic, calculations, methods and/or algorithms for controlling the searchlight 108, and generate signals to control light output by the searchlight assembly 108 and a position of the searchlight assembly 108 based on the logic, calculations, methods, and/or algorithms. In various embodiments, the commands supplied from the human-machine interface 104 to the controller 132 will cause the controller 132 to activate or deactivate the searchlight assembly 108 and/or rotate the searchlight assembly 108 about one or both of the perpendicular axes.

Figure 2:
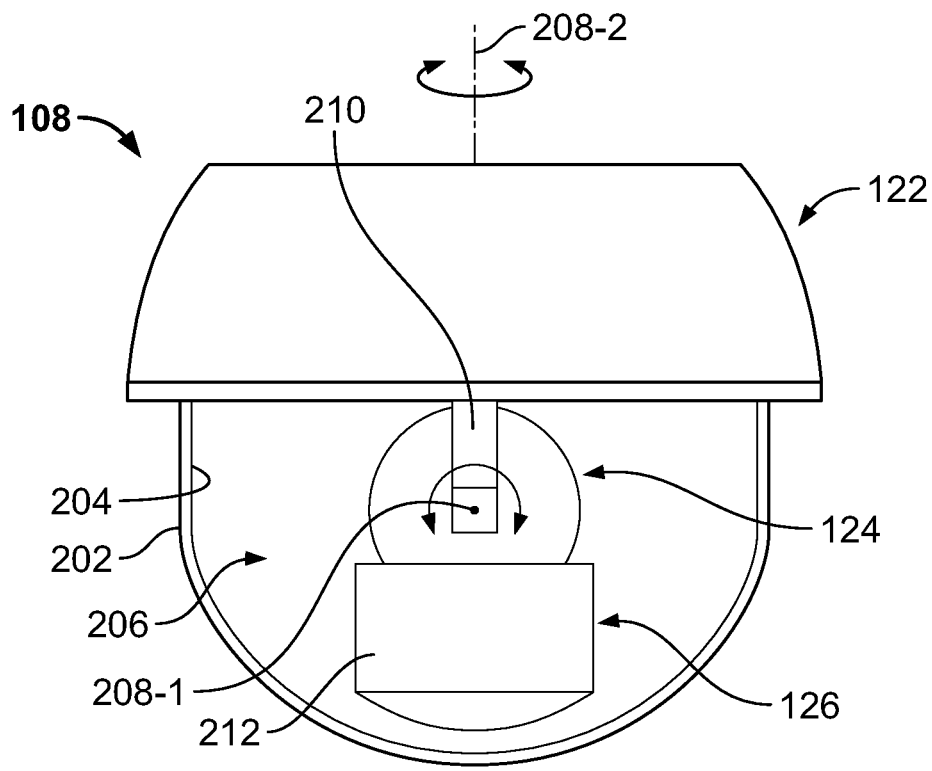
FIG. 2 depicts a side view of one physical embodiment of a searchlight assembly.
Figure 3:
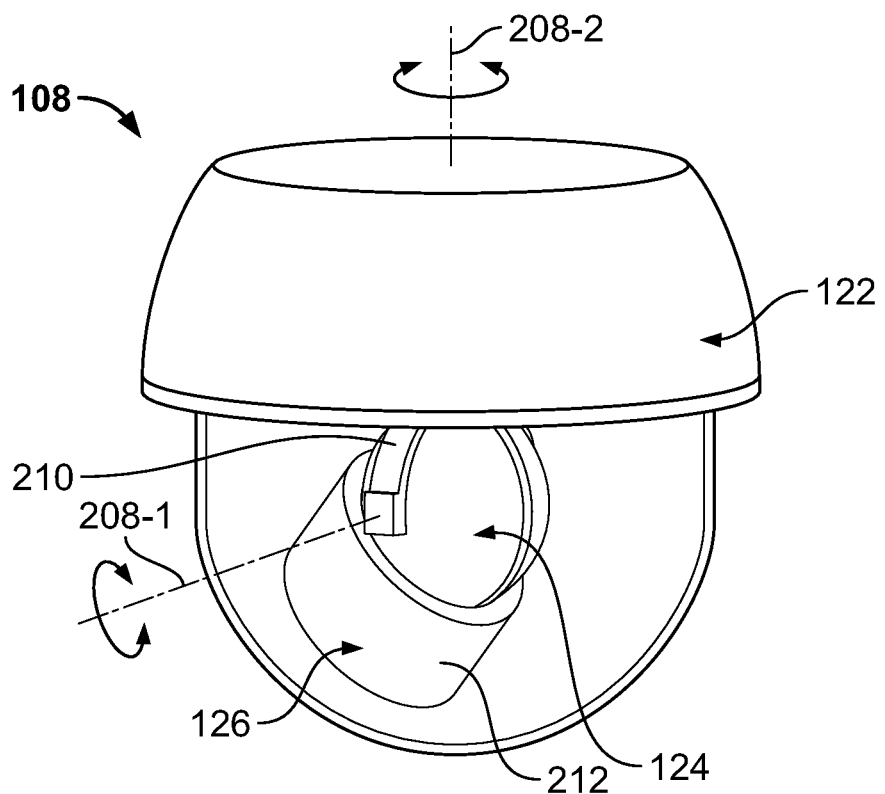
FIG. 3 depicts an isometric view of one physical embodiment of a searchlight assembly.

Referring now to FIGS. 2 and 3, side view and isometric views, respectively, of one physical embodiment of the searchlight 108 are depicted. The searchlight assembly 108 depicted therein includes the mount structure 122, the spherical motor 124, and the light source 126. As FIGS. 2 and 3 further depict, the searchlight assembly 108 additionally includes a lens 202. The lens 202 is coupled to and extends from the mount structure 122 and has an inner surface 204 that defines a cavity 206.

Figure 4:
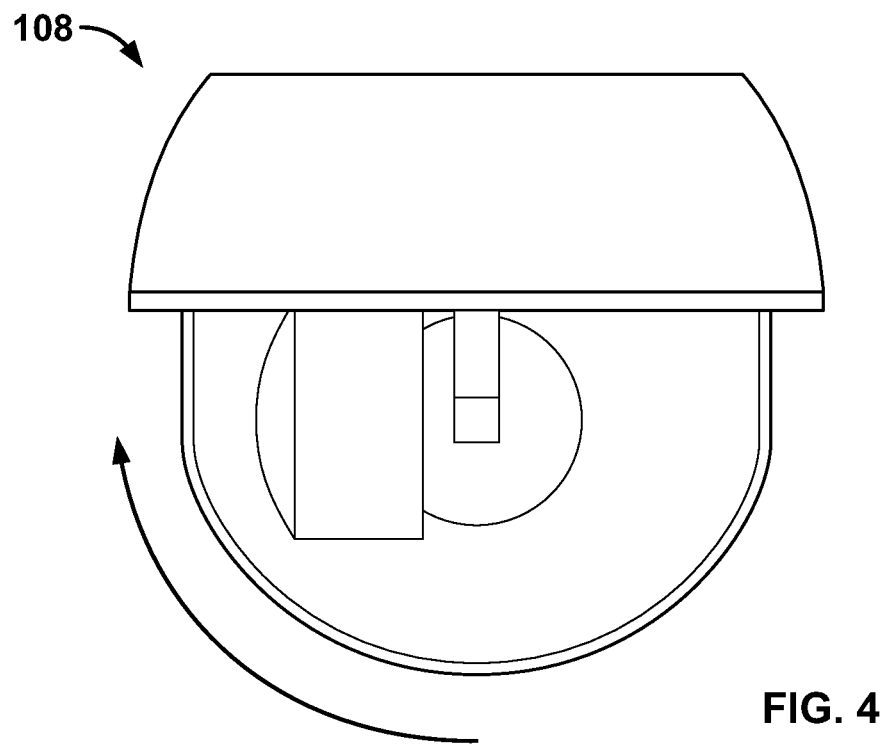
FIGS. 4 and 5 are side views of the searchlight assembly depicting the amount of rotation of the searchlight about a first rotational axis.
Figure 5:
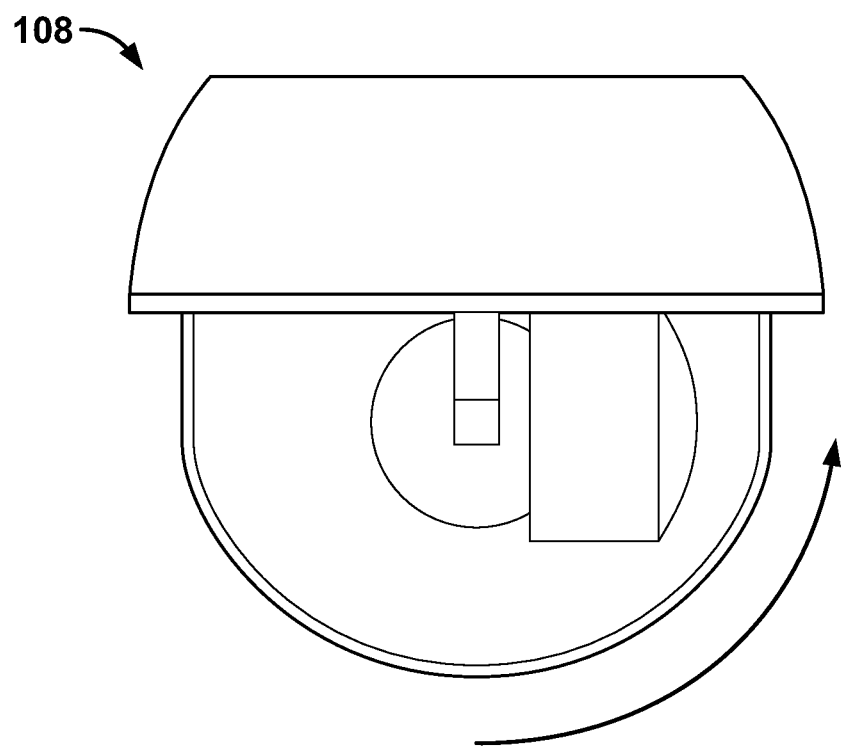
Figure 6:
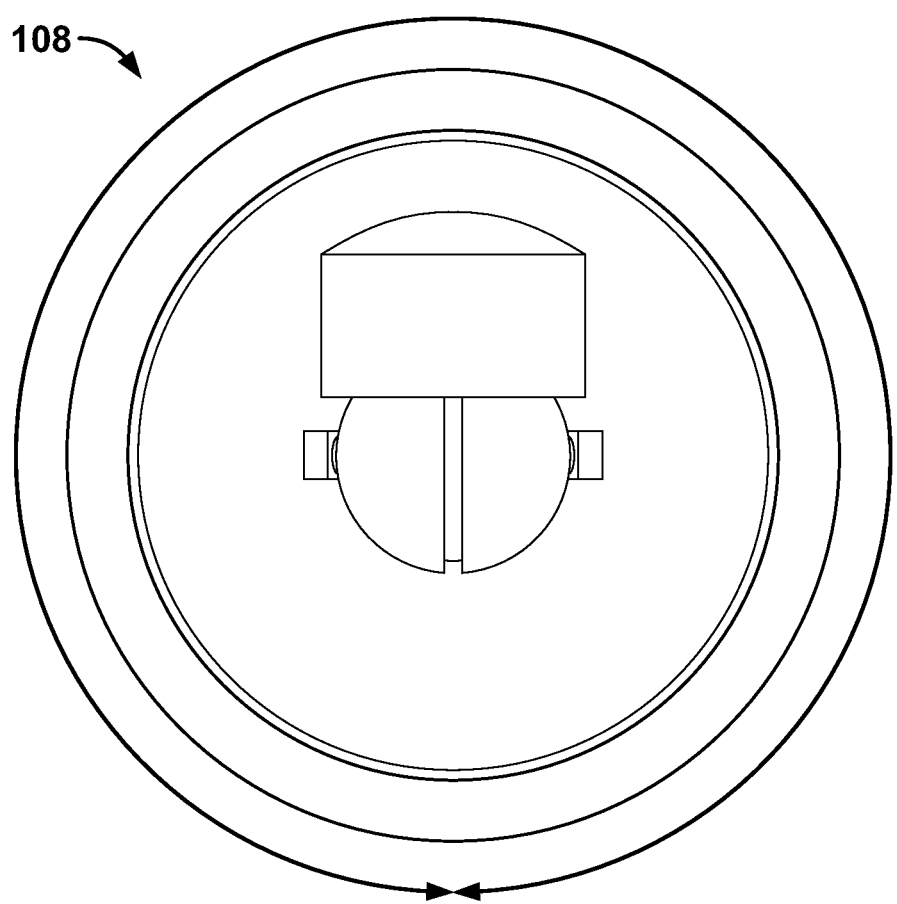
FIG. 6 is a bottom view of the searchlight assembly depicting the amount of rotation of the searchlight about a second rotational axis.

The spherical motor 124 is disposed within the cavity 206 and is rotationally coupled to the mount structure 122. The spherical motor 124 is independently rotatable, relative to the mount structure 122 and the lens 202, about the previously mentioned two perpendicular axes. The two perpendicular axes, which are depicted in FIGS. 2 and 3, include a first axis 208-1 (i.e., a tilt axis) and a second axis 208-2 (i.e., a pan axis). As shown most clearly in FIGS. 4-6, the spherical motor 124 (and thus the light source 126) is rotatable 180-degrees ($\pi$-rad) about the first axis 208-1, and is rotatable 360-degrees ($2\pi$-rad) about the second axis 208-2.

To facilitate the independent rotation about the perpendicular axes 208-1, 208-2, the searchlight assembly 108 additionally includes a bracket 210. The spherical motor 124 is mounted on the bracket 210 via suitable bearing hardware (not illustrated) that allows the spherical motor 124 to rotate, relative to the bracket 210, about the first axis 208-1. The bracket 210 is mounted on the mount structure 122 via suitable bearing hardware (not illustrated) that allows the bracket 210, and thus the spherical motor 124, to rotate, relative to the mount structure 122, about the second axis 208-2.

It will be appreciated that the spherical motor 124, and the control schemes used to control the spherical motor 124, may be implemented using any one of numerous spherical motor configurations now known or developed in the future. Some non-limiting examples of suitable spherical motor configurations, and the control schemes used to control the spherical motor, include any one of the configurations disclosed in the following U.S. Patent Applications, all of which are assigned to the assignee of the instant application: U.S. patent application Ser. No. 16/283,149, entitled "Multi-Degree-of-Freedom Electromagnetic Machine"; U.S. patent application Ser. No. 14/792,799, entitled "Multi-Degree-of-Freedom Spherical Actuator"; U.S. patent application Ser. No. 15/165,587, entitled "Multi-Degree-of-Freedom Electromagnetic Machine"; U.S. patent application Ser. No. 15/208,383, entitled "Input Amplitude Modulation Control for a Multi-Degree of Freedom Electromagnetic Machine"; U.S. patent application Ser. No. 15/369,023, entitled "Three Degree-of-Freedom Electromagnetic Machine Control System and Method"; and U.S. patent application Ser. No. 16/283,149, entitled "Spherical Brushless Direct Current Machine"; just to name a few.

The light source 126, as noted above, is coupled to the spherical motor 124 and is thus rotatable therewith about the two perpendicular axes 208-1, 208-2. The light source 126 may be implemented using any one of numerous types of light emitting devices. Some non-limiting examples include one or more halogen light bulbs, one or more laser diodes, HID lamps. In one particular embodiment, however, the light source 126 comprises a plurality of light emitting diodes (LEDs).

Regardless of how the light source 126 is specifically implemented, it is preferably disposed at least partially within a light source housing 212, which is also disposed within the cavity 206. It should be noted that the light source 126 may also, in at least some embodiments, have various types of sensors disposed therein. These sensors may include, for example, one or more motor position sensors 214, an object tracker 216, and an attitude sensor 218 (see FIG. 1).

The motor position sensors 214, when included, are operable to supply motor position signals to the motor controller 134. The motor position sensors 214 may be implemented using any one of numerous types of position sensors now known or developed in the future. Some non-limiting examples include Hall sensors, resistive sensors, encoders, just to name a few.

When included, the object tracker 216, together with the attitude sensor 218, is configured to track an object or person irrespective of the vehicle's rotation and translational motion and supply data representative thereof to the motor controller 134 and/or the human-machine interface 104. The object tracker 216 may be implemented using any one of numerous types of tracking sensors now known or developed in the future. Some non-limiting examples include a laser rangefinder, a camera, just to name a few. The attitude sensor 218 may be implemented using any one of numerous types of attitude sensors now known or developed in the future. Some non-limiting examples include an attitude and heading reference system (AHRS), and one or more inertial measurement units (IMUs), just to name a few Signals from the object tracker 216 and the attitude sensor 218 can be processed to estimate the position of the light beam position on the ground. Sensor fusion algorithms may be used and the error between the target position and actual light beam position can be compared to compute the required amount of correction. The required correction in light beam position may be supplied to the motor controller 134, which appropriately positions the spherical motor 124.

The searchlight assembly disclosed herein provides increased reliability, lower weight, as decreased size as compared to presently known searchlight assemblies. This is facilitated by employing a single spherical motor instead of two conventional actuators and by disposing the spherical motor and light source within a cavity in the protective lens. This prevents direct exposure to the environment and reduces the torque requirement for the spherical motor. For example, an 80%-90% reduction in torque may be realized.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A searchlight assembly, comprising:
    a mount structure adapted to mount to an external surface of an aircraft, the mount structure having electronics disposed therein;
    a lens coupled to and extending from the mount structure, the lens having inner surface that defines a cavity;
    a spherical motor disposed within the cavity and rotationally coupled to the mount structure, the spherical motor independently rotatable, relative to the mount structure and the lens, about two perpendicular axes;
    a light source disposed within the cavity, the light source coupled to the spherical motor and rotatable therewith about the two perpendicular axes;
    a light source housing having the light source disposed at least partially therein; and
    an object tracker and an attitude sensor disposed within the light source housing, the object tracker and attitude sensor configured to (i) track an object or person remote from the spherical motor irrespective of rotation and translational motion of an aircraft to which the mount structure is mounted and (ii) supply data representative thereof,
    wherein the electronics disposed within the mount structure comprise:
        a power supply;
        a light source driver coupled to the power supply and the light source and operable to selectively energize and deenergize the light source; and
        a motor controller coupled to the power supply and the spherical motor and further coupled to receive the data supplied from the object tracker and the attitude sensor, the motor controller operable to (i) process the data supplied from the object tracker and the attitude sensor to estimate a position of the light beam and (ii) controllably energize the spherical motor to thereby cause the spherical motor to independently rotate about the two perpendicular axes.

2. The searchlight assembly of claim 1, wherein:
    the two perpendicular axes include a first axis and a second axis;
    the spherical motor is rotatable 180-degrees (π-rad) about the first axis; and
    the spherical motor is rotatable 360-degrees (2π-rad) about the second axis.

3. The searchlight assembly of claim 1, wherein the light source comprises a plurality of Light emitting diodes.

4. The searchlight assembly of claim 1, further comprising:
    one or more motor position sensors disposed within the light source housing and operable to supply motor position signals to the motor controller.

5. A searchlight assembly, comprising:
    a mount structure adapted to mount to an external surface of an aircraft, the mount structure having electronics disposed therein;
    a lens coupled to and extending from the mount structure, the lens having inner surface that defines a cavity;
    a spherical motor disposed within the cavity and rotationally coupled to the mount structure, the spherical motor independently rotatable, relative to the mount structure and the lens, about two perpendicular axes;

a light source disposed within the cavity, the light source coupled to the spherical motor and rotatable therewith about the two perpendicular axes;

a light source housing having the light source disposed at least partially therein; and an object tracker and an attitude sensor disposed within the light source housing, the object tracker and attitude sensor configured to (i) track an object or person remote from the spherical motor irrespective of rotation and translational motion of an aircraft to which the mount structure is mounted and (ii) supply data representative thereof, wherein the electronics disposed within the mount structure comprise:

a power supply, a motor controller coupled to the power supply and the spherical motor, and further coupled to receive the data supplied from the object tracker and the attitude sensor the motor controller operable to (i) process the data supplied from the object tracker and the attitude sensor to estimate a position of the light beam and (ii) controllably energize the spherical motor to thereby cause the spherical motor to independently rotate about the two perpendicular axes, and a light source driver coupled to the power supply and the light source, the light source driver operable to selectively energize and deenergize the light source.

6. The searchlight assembly of claim 5, wherein:

the two perpendicular axes include a first axis and a second axis;

the spherical motor is rotatable 180-degrees ($\pi$-rad) about the first axis; and the spherical motor is rotatable 360-degrees ($2\pi$-rad) about the second axis.

7. The searchlight assembly of claim 5, wherein the light source comprises a plurality of light emitting diodes.

8. An aircraft searchlight system, comprising:

an aircraft;

a mount structure mounted to an external surface of the aircraft, the mount structure having electronics disposed therein;

a lens coupled to and extending from the mount structure, the lens having inner surface that defines a cavity;

a spherical motor disposed within the cavity and rotationally coupled to the mount structure, the spherical motor independently rotatable, relative to the mount structure and the lens, about two perpendicular axes;

a light source disposed within the cavity, the light source coupled to the spherical motor and rotatable therewith about the two perpendicular axes;

a light source housing having the light source disposed at least partially therein; and an object tracker and an attitude sensor disposed within the light source housing, the object tracker and attitude sensor configured to (i) track an object or person remote from the spherical motor irrespective of rotation and translational motion of the aircraft to which the mount structure is mounted and (ii) supply data representative thereof, wherein:

the two perpendicular axes include a first axis and a second axis;

the spherical motor is rotatable 180-degrees ($\pi$-rad) about the first axis; and the spherical motor is rotatable 360-degrees ($2\pi$-rad) about the second axis; and wherein the electronics disposed within the mount structure comprise:

a power supply;

a motor controller coupled to the power supply and the spherical motor; and further coupled to receive the data supplied from the object tracker and the attitude sensor the motor controller operable to (i) process the data supplied from the object tracker and the attitude sensor to estimate a position of the light beam and (ii) controllably energize the spherical motor to thereby cause the spherical motor to independently rotate about the two perpendicular axes; and a light source driver coupled to the power supply and the light source, the light source driver operable to selectively energize and deenergize the light source.

9. The aircraft searchlight system of claim 8, wherein the light source comprises a plurality of light emitting diodes.

\* \* \* \* \*